UNITED STATES PATENT OFFICE.

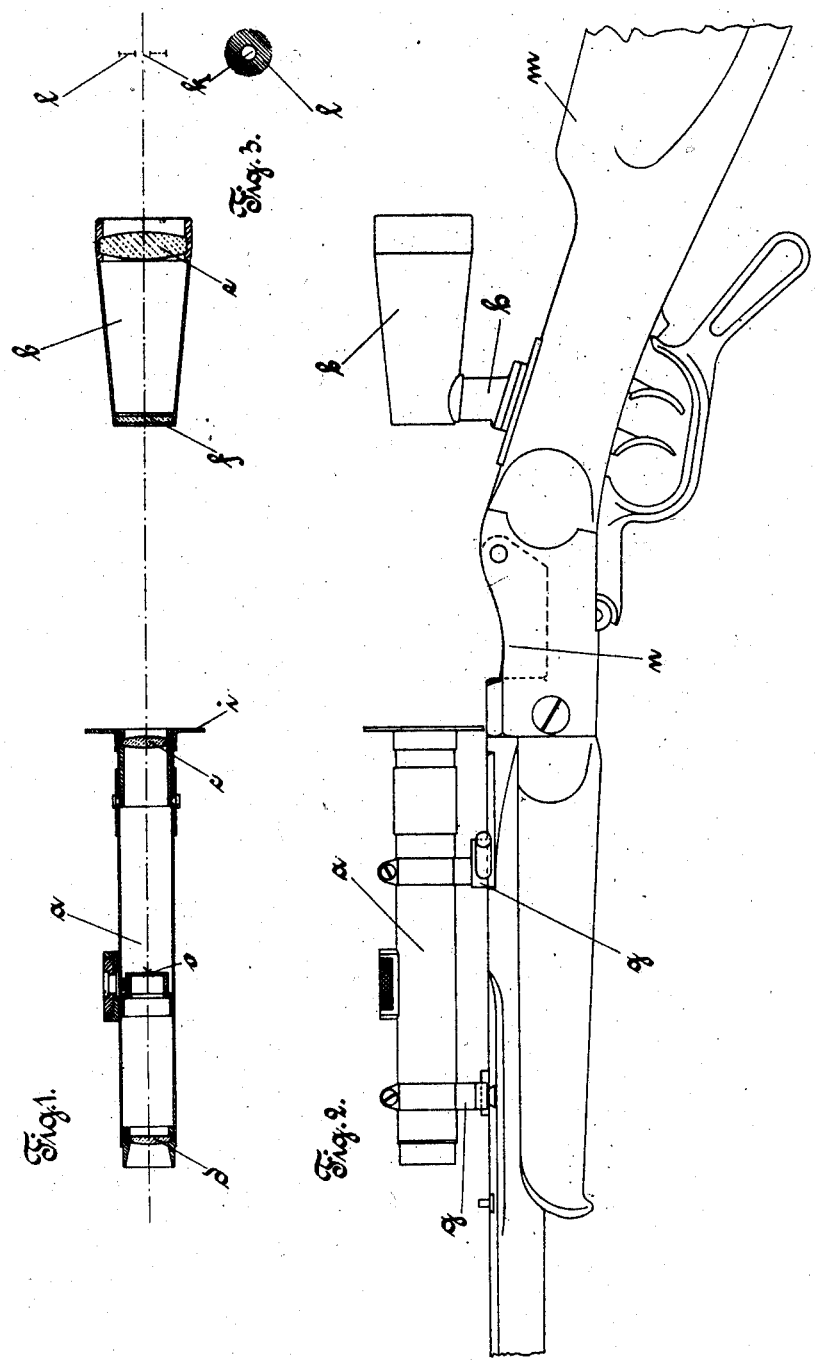

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

SIGHTING-TELESCOPE FOR ARMS AND ARM WITH SIGHTING-TELESCOPE.

No. 907,366.  Specification of Letters Patent.  Patented Dec. 22, 1908.

Application filed July 22, 1907. Serial No. 385,062.

*To all whom it may concern:*

Be it known that I, HEINRICH JACOB, engineer, a citizen of the German Empire, residing at 32ª Holsteinischestrasse, Steglitz, near Berlin, Germany, have invented certain new and useful Improvements in Sighting-Telescopes for Arms and in Arms with Sighting-Telescopes, of which the following is a specification.

My present invention relates to sighting telescopes for arms, especially small arms, more particularly for arms which have at the rear end of the barrel a closing device which must, for the insertion of a fresh cartridge or the like, be so moved that it protrudes above the barrel, and for arms in which the insertion of the cartridges or cartridge-clip is effected from above. In small-arms of this kind the attachment of ordinary sighting telescopes is attended with difficulties owing to the fact that the telescope must either be placed at a comparatively long distance from the barrel, in order to leave room for the breech to be opened, or the telescope must be made detachable so that it can be entirely removed from the fire-arm for the purpose of loading. The present invention obviates these disadvantages by mounting the ocular lens or lenses and the objective in separate parts of the telescope, care however being taken that the combination of the optical elements forms a true telescopical system, that is to say an optical system of such a kind that parallel rays of light which enter the system also leave the system substantially parrallel to each other, wherein the image reversal of the objective is compensated by a reversing system so that the sight can be arranged substantially in a focal plane, as in known sighting telescopes carrying the optical elements in one single tubular member. The telescope is so designed that the distance between the ocular and the objective is sufficient for the passage of the cartridge or cartridges, and the separate members of the telescope are so mounted on the fire-arm that there is a gap between them which enables the fire-arm to be loaded.

To prevent the entrance of dust into the interior of the separate telescope members, and to allow of easy cleaning of the outwardly directed optical elements of the telescope, it is desirable to close the ends of the telescope members either by means of the lenses mounted therein or by transparent plates.

Since sighting telescopes of the kind in question are preferably so constructed that the eye of the observer must be kept remote from the eye-piece of the telescope, the disadvantage is liable to be felt that the eye of the user is dazzled by light-rays falling thereinto when it is moved out of the zone of the field of vision. To obviate this disadvantage a screen or screens may be provided, having an aperture or apertures the axis of which coincides with the optical axis, and so arranged that the ocular produces an image thereof which surrounds the pupil in the form of a dark surface.

A construction embodying the invention is illustrated in the annexed drawing, in which Figure 1 is a central longitudinal section of the telescope; Fig. 2 shows the telescope mounted on a fire-arm, and Fig. 3 illustrates the effect produced by the screen.

The two disconnected parts of the instrument are marked $a$ and $b$ respectively. The part $a$ contains the reversing system $c$ and the objective $d$ of the telescope, and the part $b$ contains the ocular $e$. The tube of the part $a$ is closed at one end by the objective $d$ and at the other end by that lens of the reversing system $c$ which is farthest removed from the objective. The tube of the part $b$ is closed at one end by a lens of the ocular $e$ and at the other end by a glass plate $f$ with parallel surfaces. The part $a$ is provided with feet $g$, and the tube part $b$ has a foot $h$. The tube part $a$ is provided, at the end nearest the ocular part, with an annular flange $i$, the image of which, produced by the ocular $e$, surrounds the pupil $k$ in the form of an annular surface $l$. $o$ designates a sight which is arranged in a focal plane of the instrument.

In Fig. 2, showing the combination of the telescope with a fire-arm, the telescope parts are marked in the same manner as in Fig. 1. The fire-arm is marked $m$. Above the breech-block $n$ there is a gap between the disconnected telescope members, so that however near the sighting telescope is placed to the fire-arm, the gap between the two telescope parts $a$ $b$ allows cartridges to be inserted into the breech, or cartridge clips into the magazine, provided the members of the sighting telescope are attached to the fire-arm at the proper places.

For the purposes of the invention it is only essential that the sighting telescope provided with all elements of a true telescopic system with a sight positioned substantially in a focal plane comprises two separate parts so disconnected from each other that when the telescope is mounted on the fire-arm there is a gap between the ocular and the objective. There may, however, be further sub-division of the telescope; for example, the reversing system and the objective may also be mounted in disconnected telescope parts. It is essential that the objective and sight (vane or hair-cross) are fixedly mounted on the barrel, whereas the immobility of the other telescope parts is of less importance. If a prism reversing system is inserted between the objective and sight this system must also be immovable relatively to the objective, sight and barrel.

Having now particularly described and ascertained the nature of my said invention and in what manner the same is to be performed, I declare that what I claim is:—

1. A sighting telescope for arms comprising an objective, an image reversing system, an ocular and a sight substantially in a focal plane of the telescope, said elements being mounted in at least two disconnected telescope members in such a manner that same form a true telescopical system.

2. A sighting telescope for arms comprising an objective, an image reversing system, an ocular and a sight substantially in a focal plane of the telescope, said elements being mounted in at least two disconnected tubular telescope members, one of said tubular members different from the ocular carrying tube being provided with a projecting flange-like part.

3. An arm having a sighting telescope mounted thereon, said sighting telescope comprising an objective, an image reversing system and an ocular forming together a true telescopical system, and a sight arranged substantially in a focal plane of said telescopical system, said elements of the telescope being mounted in at least two disconnected tubular members provided on the arm in such a manner that a gap is formed above the breech or cartridge magazine of the arm between the ocular carrying member on the one hand on the objective and image reversing system carrying members on the other hand.

In testimony whereof I have signed this specification in the presence of two subscribing witnesses.

HEINRICH JACOB.

Witnesses:
 HENRY HASPER,
 WOLDEMAR HAUPT.